O. ZERK.
GREASE CUP.
APPLICATION FILED NOV. 18, 1912.
1,057,793. Patented Apr. 1, 1913.
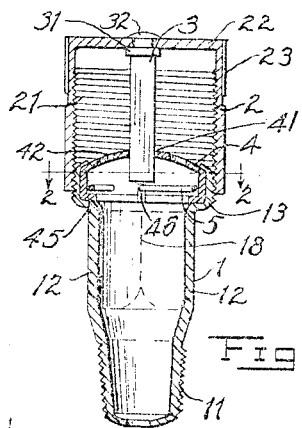
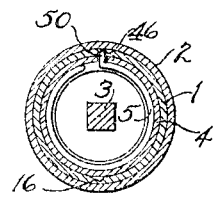
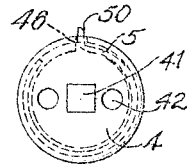
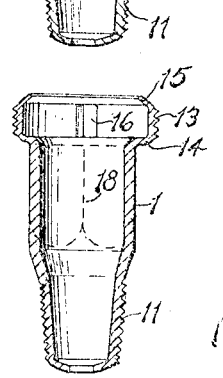
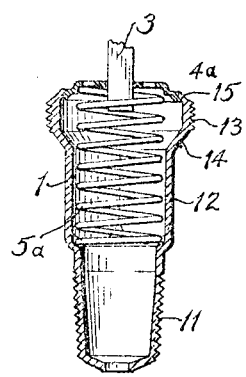
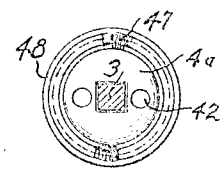
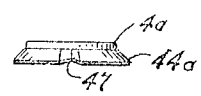
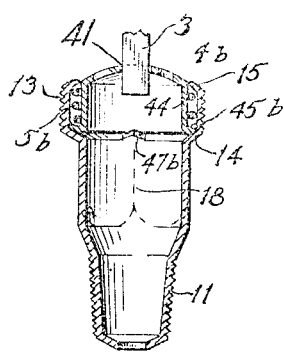
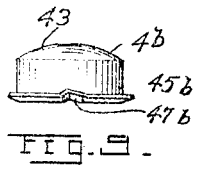
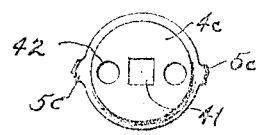
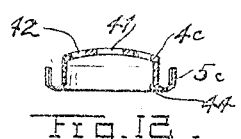
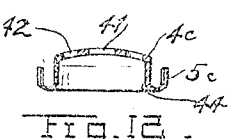
Witnesses:
Justin Macklin
R. L. Bruck
Inventor
Oscar Zerk,
By Albert H. Bates,
Atty.

UNITED STATES PATENT OFFICE.

OSCAR ZERK, OF CLEVELAND, OHIO, ASSIGNOR TO THE ZERK MANUFACTURING COMPANY, OF CLEVELAND, OHIO, A CORPORATION OF OHIO.

GREASE-CUP.

1,057,793.   Specification of Letters Patent.   Patented Apr. 1, 1913.

Application filed November 18, 1912. Serial No. 731,941.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Grease-Cups, of which the following is a full, clear, and exact description, reference being had to the accompanying drawings.

This invention relates to grease cups of the type having a cup member, a cap screw threaded thereon, and internal mechanism to retard the rotation of the cap and prevent any undesired operation thereof.

The object of the invention is to provide such a grease cup in a form which shall be simple and very economical in its production, and be efficient in service. To this end I have provided a cup with an external thread, an internally threaded cap screwing on to the cup and having a centrally placed non-circular bar which rotates with the cap, there being a head rotatably carried by the cup having a non-circular opening which said bar engages, and a spring causing a periodic frictional locking of the head to cap as the cup rotates. By this means, the detent mechanism for the cap is contained entirely within the grease cup. It is thereby protected and out of the way, and the grease cup is enabled to have a very neat appearance.

The invention is hereinafter fully explained and its essential characteristics set out in the claims.

In the drawings, Figure 1 is a longitudinal or axial section of one form of my grease cup, the parts being shown in the position they occupy when the cup is practically full of grease; Fig. 2 is a cross section of such cup, indicated by the line 2—2 on Fig. 1; Fig. 3 is a plan of the retaining head and spring; Fig. 4 is a vertical section of the cup member alone; Fig. 5 is a vertical section of a modified form of cup member and retaining device; Fig. 6 is a plan of such retaining head; Fig. 7 is an edge view of the retaining head of this modification; Fig. 8 is a vertical section of another modification of the cup member; Fig. 9 is a side elevation of the retaining head of this member; Fig. 10 is a top plan of such head; Figs. 11 and 12 illustrate a head for mounting in the cup member and having a portion of itself constituting the detent spring, Fig. 11 being a plan of this modification and Fig. 12 a vertical section thereof.

Referring to all of the embodiments shown, 1 represents the cup, 2 the cap, 3 the non-circular bar carried by the cap, 4 the head rotatably carried by the cup, and 5 the spring coöperating with the head. The cup may be pressed from sheet metal (preferably in the form illustrated in the drawing), where there is an externally threaded or nipple portion 11, above which is an angular portion 12 (which may be hexagonal, for example, as indicated by the vertical lines 18), and above this angular portion is an outwardly pressed head portion 13 having external screw threads.

The cap 2 is preferably a pressed sheet metal member. It has preferably a cylindrical wall, within which are internal threads 21. Near the upper edge of the wall the cap has a knurled portion, as at 23, to provide a good finger hold. The bar 3 is of any non-circular form and is shown as a square bar. It is securely fastened to the top of the cap, for example, by forming the upper portion of this bar with an outward shoulder 31 and a shank 32, which extends through an opening in the top of the cap and is riveted over above the top, as shown in Fig. 1.

The rotatable head 4, 4ª, 4ᵇ or 4ᶜ in the different embodiments stands within the cup and has a non-circular (in this case square) opening 41 which the rod 3 occupies, so that the head is necessarily turned as the cap is screwed on to the cup. Suitable openings 42 are made through the head to allow the passage of the grease, as, for example, the two shown in Figs. 1 and 3. Suitable means, hereinafter to be described, are provided, whereby the head 4, while capable of rotating in the cup, has its rotation restricted periodically and more severely in the screwing-off direction than in the screwing-on direction. The result of this is that the cap may be easily turned on to the cup to feed the grease, but to turn it off requires greater force, whereby one does not inadvertently turn it off when he intends to turn it on, and, in turning it on, the periodic restriction of the rotation indicates the amount it is turned and forms a convenient measure for the feed of the grease.

The head 4 in Figs. 1 to 4; 4ª in Figs. 5 to 7; 4ᵇ in Figs. 8 to 10; and 4ᶜ in Figs. 11 and 12 is in each case mounted within the head of the cup resting on the outward shoulder 14 where the cup flares from the angular portion and held in place by the turned-in top flange 15 of the cup wall. The head, in each case, has a top portion 23 which is preferably of an upwardly rounding form and has a downwardly extending wall or portion which lies within the cup. As stated the head has the angular opening 41 for the bar 3 and one or more grease openings 42.

The description so far given applies to the construction of all of the figures, the omitted parts of the cap in Figs. 5 and 8 being similar to that shown in Fig. 1. The difference in the various embodiments shown resides in the spring detent connection between the head and the cup. I will now describe this spring detent connection for the various views.

In the form shown in Figs. 1 to 4, the head 4 is inwardly flanged at its lower edge, as shown at 45 and above this flange is mounted the spring 5. This spring is a partially circular piece of wire having an end 50, which is turned outwardly through an opening 46 in the head. This projecting end 50 of the spring is adapted to bear against the cup wall as the head is turned, and to spring into notches 16 formed in that wall, as shown in Fig. 4. The notches preferably each have one face gradually inclining and the other abruptly inclining, the gradually inclined face opposing rotation of the cap in the screwing on direction and the abrupt face opposing rotation in the screwing-off direction, so that the cap, which in turning must turn the head, will rotate more freely in the screwing-on direction than in the screwing-off direction.

In the embodiment shown in Figs. 5 to 7, the head 4ª itself carries a projection 47, pressed upwardly from the wall or flanged edge 44ª of the head, adapted to coöperate with a corresponding depression in the overturned edge 15 of the cup. In this case I provide a coiled spring 5ª within the cup, pressing the head upwardly and bearing at its lower end against the internal shoulder provided where the angular portion joins the nipple portion of the cup.

In the form shown in Figs. 8 to 10, the head 4ᵇ has at the lower edge of its wall 44 an outward flange 45ᵇ which provides an annular space beneath the inward edge 15 of the cup for the reception of a helical spring 5ᵇ. This spring tends to press the head downwardly so that a notch or upwardly pressed shoulder 47ᵇ in the flange 45ᵇ coöperates periodically with a corresponding shoulder in the cup portion 14.

In the form shown in Figs. 11 and 12, the head 4ᶜ is designed to fit into the cavities shown in the cup in Fig. 1, but the separate spring is omitted and instead thereof portions of the lower edge of the wall 44 are turned outwardly in the form of spring fingers 5ᶜ which coöperate with the notches 16 in the inner surface of the wall 13 of the head.

In any of the forms of head and spring shown, it will be seen, the head has a spring detent connection with the cup and has a rotatable connection with the cap which slidatably engages the head, so that the turning of the cap rotates the head, and the head has a periodically restrained spring engagement with the cup. The spring detent device is entirely hidden from view, is efficient in action, and the whole construction is simple and cheap to construct, is durable and not liable to get out of order.

Having thus described my invention, what I claim is:

1. The combination of a cup, a member rotatably carried thereby and having a spring detent connection therewith, a cap screwing onto the cup, and a bar carried by the cap and occupying an opening in the member.

2. In a grease cup, the combination of a cup having a bore and a head with an external thread, a rotatable member seating in the cup, a spring detent connection between the rotatable member and cup, a cap screwing onto the head, a non-circular bar carried centrally and rigidly by the cap and occupying a corresponding opening in said rotatable member.

3. In a grease cup, the combination of a cup having a bore and a screw-threaded exterior, a rotatable head mounted within the cup and held therein by the upper end of the cup being bent inwardly over the head, said head having an opening for the passage of grease, a cap screwing onto the cup and having a device slidably engaging the head, and a spring detent connection between the rotatable head and cup.

4. The combination of a cup having an enlarged recess within its upper portion, a head rotatably mounted within said recess and held therein by the upper end of the cup being flanged inwardly above the head, a cap screwing onto the cup, a non-circular member carried by the cap and occupying an opening in the head, a shoulder on the cup, and a coöperating projection carried by the head under spring action.

5. The combination of a cup having an externally threaded enlarged portion, a cap screwing onto said cup and having a central non-circular bar rigidly secured to the top of the cap and depending within it, a head rotatably mounted within the enlarged upper portion of the cup, said head being held in place by the inward flanging of the top wall of the cup, there being grease openings through the top of the head, and a spring acting to cause a periodically locking engagement of the head and cup.

6. In a grease cup, a sheet metal pressed cup member having a portion with a bore and an enlarged head with an external screw thread, a head made of sheet metal and rotatably held in the cup member, a cap having a cylindrical wall with an internal screw thread engaging the cup and having a noncircular rigidly carried central rod engaging a correspondingly placed opening in the head, a notch in the cup wall, a corresponding projection carried around by the rotation of the head, and a spring tending to force the projection into the notch, the wall of the notch being gradual in a direction to turn on the cap and abrupt in the direction to turn it off.

7. In a grease cup, the combination of a cup member having an internal bore and having an outwardly extended head portion with an enlarged internal recess and external threads, a cap screwing onto said head, a rotatable head having a disk portion with a flanged edge, such flange standing within the recess of the cup-head, the upper end of the cup member being flanged inwardly to hold the rotatable head in place, one or more notches in the cup member, a spring associated with the head, and a projection which coöperates with said notch or notches under the influence of said spring.

In testimony whereof, I hereunto affix my signature in the presence of two witnesses.

OSCAR ZERK.

Witnesses:
 ALBERT H. BATES,
 BRENNAN B. WEST.